United States Patent
Yu et al.

(10) Patent No.: US 11,002,751 B2
(45) Date of Patent: May 11, 2021

(54) APPARATUS FOR SEPARATION, WASHING AND MIXING OF MAGNETIC PARTICLES IN A REACTION CUP, ADAPTED TO BE USED IN AN IMMUNOANALYZER SYSTEM

(71) Applicant: Technogenetics Holdings S.r.l., Milan (IT)

(72) Inventors: Chao Yu, Shanghai (CN); Shenguang Su, Shenzhen (CN); Qingwen Tang, Putian (CN); Luca Melillo, Lioni (IT)

(73) Assignee: Technogenetics Holdings S.r.l., Milan (IT)

( * ) Notice: Subject to any disclaimer, the term of this patent is extended or adjusted under 35 U.S.C. 154(b) by 101 days.

(21) Appl. No.: 15/512,576

(22) PCT Filed: Sep. 25, 2015

(86) PCT No.: PCT/EP2015/072173
§ 371 (c)(1),
(2) Date: Mar. 20, 2017

(87) PCT Pub. No.: WO2016/046402
PCT Pub. Date: Mar. 31, 2016

(65) Prior Publication Data
US 2017/0292966 A1    Oct. 12, 2017

(30) Foreign Application Priority Data
Sep. 25, 2014   (CN) .......................... 201410499677.4

(51) Int. Cl.
*G01N 35/00*    (2006.01)
*G01N 35/02*    (2006.01)

(52) U.S. Cl.
CPC ....... *G01N 35/0098* (2013.01); *G01N 35/025* (2013.01); *G01N 2035/00564* (2013.01)

(58) Field of Classification Search
CPC ............. G01N 35/0098; G01N 35/025; G01N 2035/00564
See application file for complete search history.

(56) References Cited

U.S. PATENT DOCUMENTS 4,227,886 A * 10/1980 Bullock ............. G01N 21/9018
                                                          436/49
5,550,059 A *  8/1996 Boger ................... G01F 23/242
                                                          422/106

(Continued)

FOREIGN PATENT DOCUMENTS

CN      103599898         2/2014
CN      103599898  A  *   2/2014

(Continued)

OTHER PUBLICATIONS

International Search Report and the Written Opinion dated Dec. 2, 2015 From the International Searching Authority Re. Application No. PCT/EP2015/072173.

*Primary Examiner* — Benjamin R Whatley (57) ABSTRACT

Apparatus for separation, washing and mixing of magnetic particles in at least one reaction cup, adapted to be used in an immunoanalyzer system, said at least one reaction cup containing nanometric magnetic particles (beads) binding immuno-complex antibody, antigen molecules, and liquid, comprising:
  a supporting dial mechanism (11) in the form of a rotating carousel, comprising an upper side with a number of holes adapted to host a corresponding number of said at least one reaction cup (1) in substantially vertical positions, and a lower side comprising a number of guide grooves (2) radially behind corresponding holes of the upper side,
  a number of magnet mechanisms (30) adapted to be inserted in corresponding ones of said guide grooves (Continued)

(2) and to slide therein, so as to radially approach to or depart from the side external surface of corresponding ones of said at least one reaction cup (1);

at least one washing mechanism (40) firmly installed around said supporting dial mechanism (11), and comprising a washing needle (44) able to move vertically in and out said at least one reagent cup for charging or extracting said liquid;

at least one mixing mechanism (70) firmly installed behind and aside said supporting dial mechanism (11), adapted to shake (stir) at least one reaction cup so as to mix the content of the reaction cup.

5 Claims, 10 Drawing Sheets

(56) References Cited

U.S. PATENT DOCUMENTS

| | | | |
|---|---|---|---|
| 2009/0191094 A1* | 7/2009 | Kayahara | G01N 35/04 422/64 |
| 2013/0273552 A1 | 10/2013 | Ohashi | |
| 2014/0356235 A1* | 12/2014 | Uchikawa | G01N 35/0098 422/82.09 |

FOREIGN PATENT DOCUMENTS

| | | |
|---|---|---|
| EP | 2290365 | 3/2011 |
| WO | WO 2013/181019 | 12/2013 |
| WO | WO 2016/046402 | 3/2016 |

* cited by examiner

APPARATUS FOR SEPARATION, WASHING AND MIXING OF MAGNETIC PARTICLES IN A REACTION CUP, ADAPTED TO BE USED IN AN IMMUNOANALYZER SYSTEM

RELATED APPLICATIONS

This application is a National Phase of PCT Patent Application No. PCT/EP2015/072173 having International filing date of Sep. 25, 2015, which claims the benefit of priority of Chinesse Patent Application No. 201410499677.4 filed on Sep. 25, 2014. The contents of the above applications are all incorporated by reference as if fully set forth herein in their entirety.

FIELD AND BACKGROUND OF THE INVENTION

The present invention relates to an apparatus for separation, washing and mixing of magnetic particles in a reaction cup, adapted to be used in an immunoanalyzer system.

Within the framework of the development of magnetic separation technology, immunoanalyzer technology is getting more and more widely used in medical industry. The automatic immunoanalyzer, during testing, needs to use nanometric magnetic beads to let immuno-complex antibody, antigen molecules binding by means of a chemical agent. After binding of nanometer magnetic beads with antibody and antigen, the residual liquid in the reaction cup is needed to be cleaned. At present, the known magnetic separation mechanisms are linearly distributed among the automatic immunoanalyzers with various units for achieving synchronous treating various samples or reducing waiting time of single sample separation and washing.

The known magnetic separation mechanisms are complex in structure, large in size, causing inconvenience for installation and maintenance.

In addition a magnetic particle mixing mechanism is also necessary, but in the known immunoanalyzers it is equipped outside the magnetic separation device. This worsen the complexity of the overall structure.

SUMMARY OF THE INVENTION

Therefore it is the main object of the present invention to provide an apparatus for separation, washing and mixing of magnetic particles in a reaction cup, adapted to be used in an immunoanalyzer system, which overcomes the above problems or drawbacks.

The basic idea of the present invention is to find a solution to achieve the processes of separation, washing and mixing in the same apparatus. The apparatus of the invention features simple structure, and separation and washing efficiency of the equipment is improved.

Multiple workstation separation and washing can be synchronously achieved with mixing workstation the operation speed of the overall immunoanalyzer system is higher. Treating various samples synchronously benefits a more simple flow and improved analysis efficiency.

An object of the present invention is an apparatus for separation, washing and mixing of magnetic particles in at least one reaction cup, adapted to be used in an immunoanalyzer system, said at least one reaction cup containing nanometric magnetic particles (beads) binding immuno-complex antibody, antigen molecules, and liquid, characterized in that it comprises:

a supporting dial mechanism in the form of a rotating carousel, comprising an upper side with a number of holes adapted to host a corresponding number of said at least one reaction cup in substantially vertical positions, and a lower side comprising a number of guide grooves radially behind corresponding holes of the upper side, a number of magnet mechanisms adapted to be inserted in corresponding ones of said guide grooves and to slide therein, so as to radially approach to or depart from the side external surface of corresponding ones of said at least one reaction cup;

at least one washing mechanism firmly installed around said supporting dial mechanism, and comprising a washing needle able to move vertically in and out said at least one reagent cup for charging or extracting said liquid;

at least one mixing mechanism firmly installed behind and aside said supporting dial mechanism, adapted to shake (stir) at least one reaction cup so as to mix the content of the reaction cup;

a control system adapted to: let said supporting dial mechanism rotate, step by step, so as to stop in positions such as said holes are in correspondence of said at least one washing mechanism or in correspondence of said at least one mixing mechanism; to allow the vertical movement of said washing needles when the correspondence of said holes and washing mechanism is verified, while controlling the magnet mechanisms to stay approached to said reagent cup, and after to allow the shaking action of said at least one mixing mechanism when the correspondence of said holes and mixing mechanism is verified, while controlling the magnet mechanisms to stay departed from said reagent cup.

These and further objects are achieved by means of an apparatus for separation, washing and mixing of magnetic particles in a reaction cup, adapted to be used in an immunoanalyzer system as described in the attached claims, which are considered an integral part of the present description.

BRIEF DESCRIPTION OF THE SEVERAL VIEWS OF THE DRAWINGS

The invention will become fully clear from the following detailed description, given by way of a mere exemplifying and non-limiting example, also with reference to the attached drawing figures, wherein.

The same reference numerals and letters in the figures designate the same or functionally equivalent parts.

DESCRIPTION OF SPECIFIC EMBODIMENTS OF THE INVENTION

By the present invention it is provided a magnetic separation, washing and mixing apparatus, comprising supporting dial mechanism, magnetic particle separation and mixing mechanism, and washing mechanism; the magnetic particle separation and mixing mechanism is installed on the supporting dial mechanism, the washing mechanism is distributed around the supporting dial mechanism; the magnetic particle separation and mixing mechanism controls a magnet to attract nanometer magnetic beads in the liquid of reaction cup placed on the supporting dial mechanism, and the washing mechanism cleans the liquid in the reaction cup to complete nanometer magnetic beads separation.

The magnetic particle separation and mixing mechanism equipped on the supporting dial mechanism is also used for automatically mixing the liquid in the reaction cup, and no other external mixing mechanism is needed.

The magnetic separation mechanism integrates various functions including rotation, automatic charging, extraction, automatic absorption, opening magnet, automatic lifting of reaction cup and automatic mixing reaction liquid; with progressive rotation speed of the step motor when driving the timing belt, the reaction cup rotates along the dial. There are eight holes in the dial to host respective reaction cups. Each progression step moves to the next hole. Time interval between progression steps if fixed, meaning rotation of 45° for each progression.

Four independent charging and extraction mechanisms achieve flexible and automatic charging and extraction of liquid in the cups. A lifting and climbing block can lift up the reaction cup by level: it firstly reaches mixing height, and then rises to the cup catching height. At the cup catching position, it easily allows the reaction cup catching from the upper side of the supporting dial mechanism, and no other lifting mechanism to lift the reaction cup up is needed. In addition, this magnetic separation mechanism may flexibly control extraction time of the magnet, and its structure features compact, less room, good repeatability of each moving part, and function of nanometer magnetic beads separation on the immunoanalyzer and automatic washing is achieved.

A control system (not shown in the figures) is devoted to control all the operations of various parts of the apparatus, also controlling the time sequence of the operations.

Multiple workstation separation, washing and mixing is achieved in the same mechanism. When action process of a certain workstation is being performed, action processes of the other workstations are also performed. There is no need for a magnetic particle mixing mechanism outside the device, and no need for linearly distributing various units of the same kind. By rotation of the supporting mechanism, with principle of cam movement and eccentric movement for mixing, the action processes above are achieved. The simple structure benefits a higher efficiency of separation and washing at the same time.

A detailed description is given in the following of non-limiting examples of embodiments of the invention with reference to the drawing figures.

Figure 1:
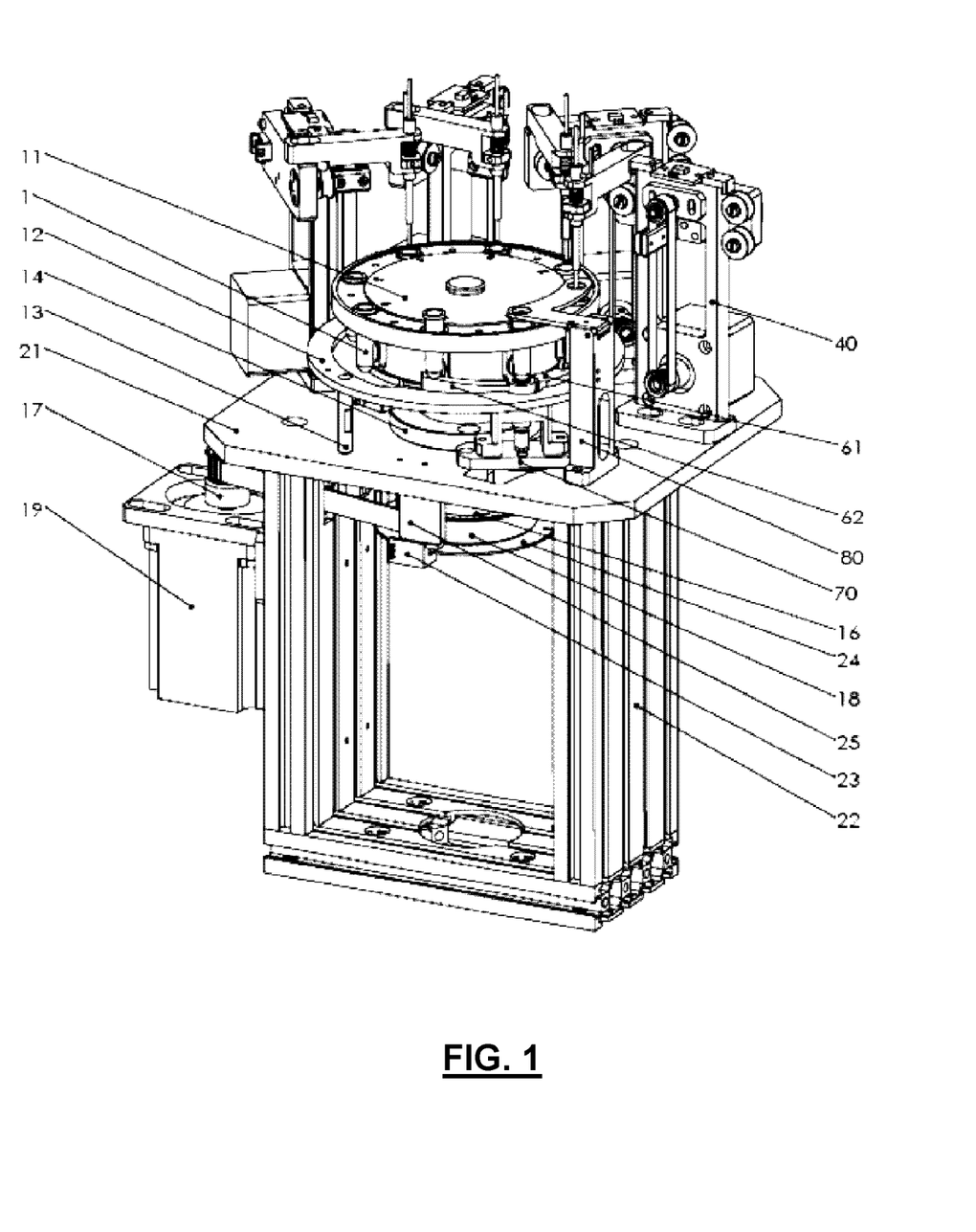
FIG. 1 is an overall structure illustration of the apparatus of the invention.
Figure 2:
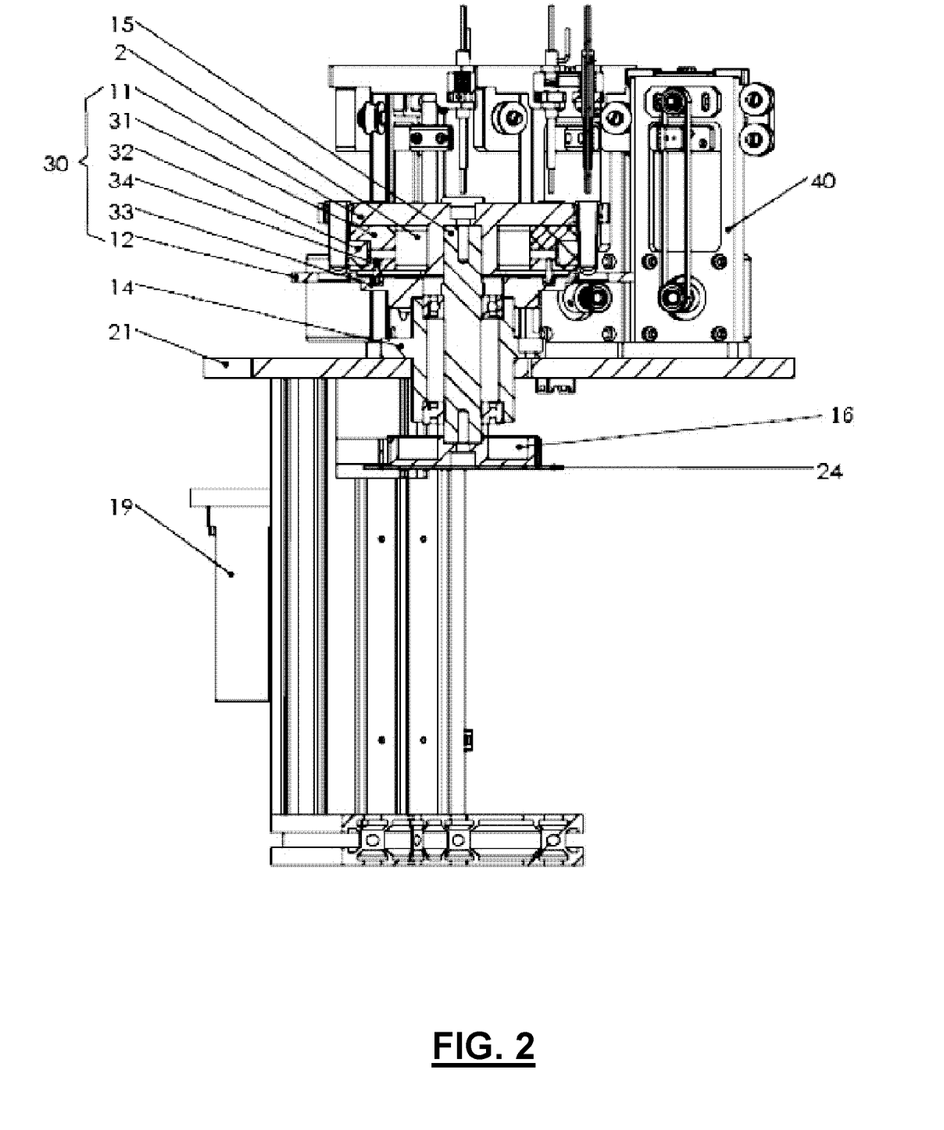
FIG. 2 is an overall section view of the apparatus of the invention.

As shown in FIG. 1 and FIG. 2, the supporting dial mechanism consists of a supporting dial 11, fixation plate 12, supporting nails 13, bearing pedestal holder 14 with bearing mounted on, dial spindle 15, first timing driven pulley 16, first timing driven pulley 17, first timing belt 18, first step motor 19, mounting plate 21, fixation supporting frame 22, first home sensor 23, first home inducer 24 and first home sensor fixed fixation base 25.

The mounting plate 21 is horizontally fixed at top of the supporting frame 22. The fixation plate 12 is fixed with at least two supporting nails 13 on to the mounting plate 21; the bearing pedestal with bearing 14 is installed on the mounting plate 21.

The dial 11 is fixed on upper part of the dial spindle 15; the dial spindle 15 connects to the bearing and the lower part of the dial spindle passes through the mounting plate and connects to the first timing driven pulley 16; the first timing driver pulley 17 connects to first timing driven pulley 16 by first timing belt 18 for transmission; the first step motor 19 is installed at the side of the fixation supporting frame 22; first step motor finally drives the dial to rotate with first timing driver, first timing belt, first timing driven pulley and the dial spindle.

The first home sensor fixation base 25 is installed at bottom of the mounting plate 21, the first home sensor 23 is installed on the first home sensor fixed base 25, and the first home inducer 24 is installed with the first timing driven pulley 16.

Figure 11:
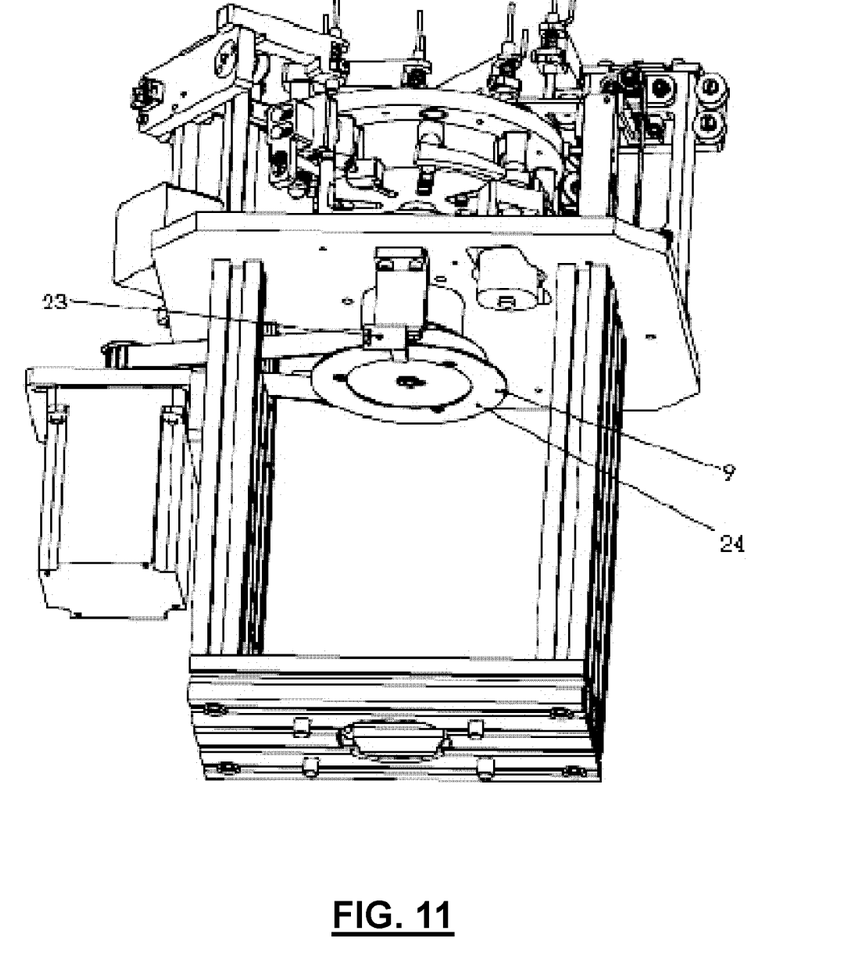
FIG. 11 is an overall structure illustration of the apparatus of the invention from the lower side.

As shown in FIG. 11, the first home inducer 24 is round in shape, the ring is equipped with notch 9. The motor drives the dial to rotate. First timing driven pulley 16 moves along the motor. First home inducer blocks the light path of first home sensor 23. When the notch is moved to the first home sensor, the light path of the first home sensor is not blocked. At this time, the dial finds its initial position.

Figure 3:
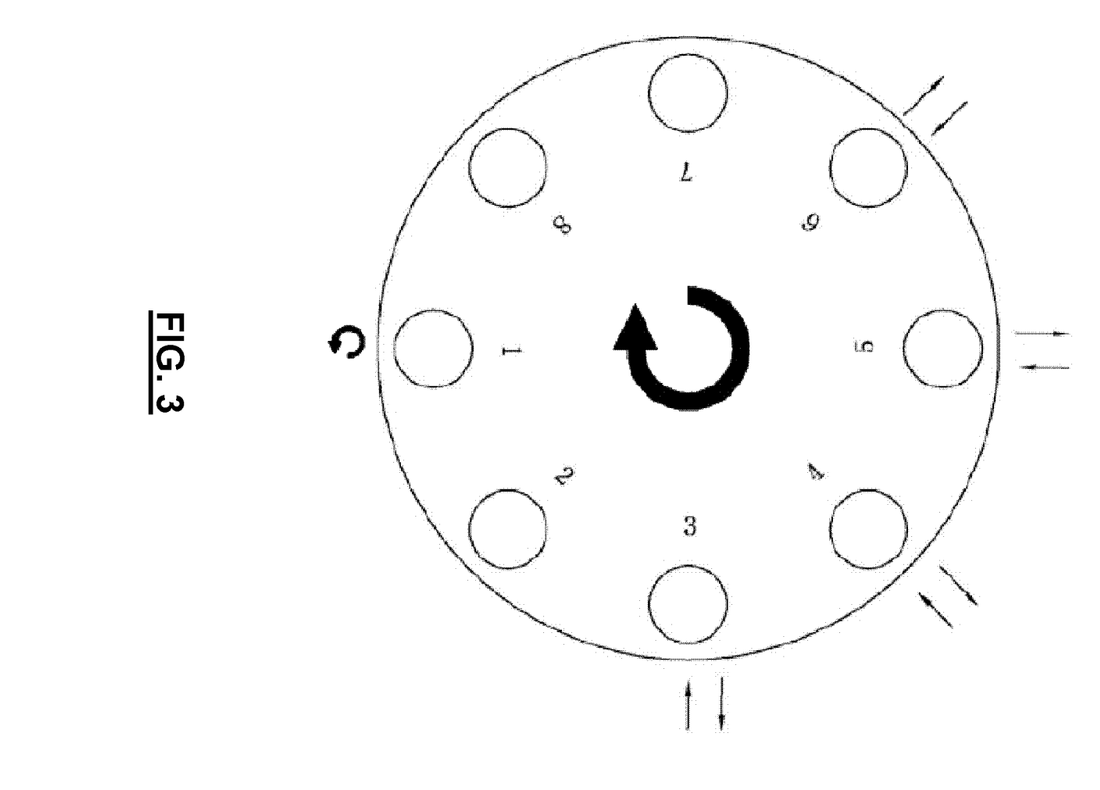
FIG. 3 is an illustration of the upper side of the workstation of the apparatus of the invention.

As shown in FIG. 3, the upper side of the supporting dial is equipped with eight holes where the reaction cups can be inserted, and behave as respectively the cup placing hole, in substantially vertical positions, cup catching hole, mixing hole and washing holes. Each washing position shall complete liquid extraction and charging in the reaction cup.

As shown in FIGS. 5, 6, 7 and 7a, the supporting dial 11 is equipped with reaction cup holes for placing the reaction cups 1, and guiding groove 2 for placing magnet sliding block 31 which is placed under the reaction cup hole.

The magnet mechanism 30 comprises magnet sliding block 31, permanent magnet 32, roller 33, pin roll 34; a cam groove 5 is equipped in the fixation plate 12. The permanent magnet 32 is inserted in the magnet sliding block 31, one end of the first pin roll 34 connects to the roller 33, and the other end is closely installed in the lower side of the magnet sliding block 31. The magnet sliding block 31 is inserted in the guiding groove 2 of the dial 11 with the permanent magnet 32 outward, the roller 33 of the magnet sliding block 31 is installed in the cam groove 5 of the fixation plate 12. Along with rotation of the dial 12, the roller 33 of the magnet sliding block rolls along the cam groove. The magnet sliding block moves in radial direction in the guiding groove to attract (part 5a of the cam groove) or release (part 5b of the cam groove) the magnetic beads in the reaction cup. In fact the fixation plate 12 is fixed on the mounting plate 21, while the supporting dial 11 rotates: during rotation the part 5a of the cam groove lets the permanent magnet approach the side external surface of the reaction cup, instead the part 5b of the cam groove lets the permanent magnet depart from the side external surface of the reaction cup.

Figure 6:
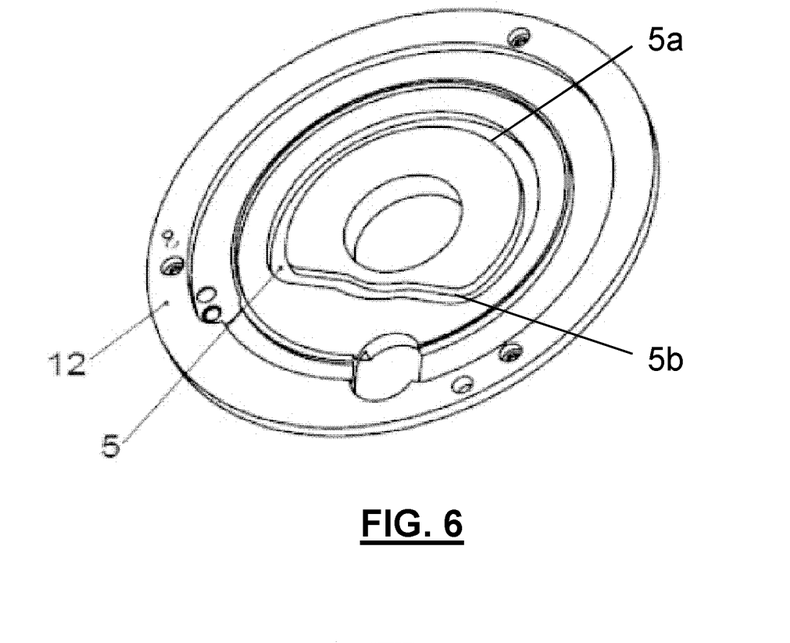
FIG. 6 is a structure illustration of the cam groove of the apparatus of the invention.
Figure 7:
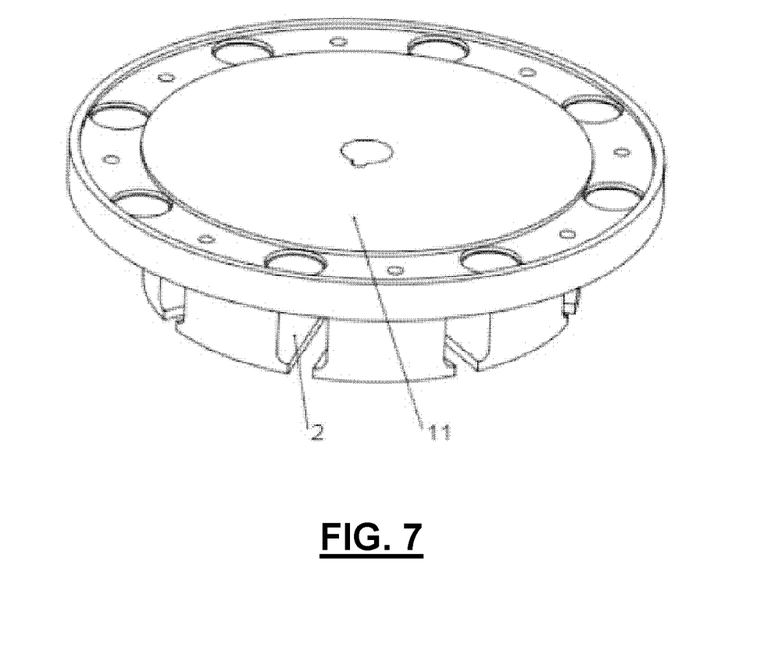
FIG. 7 is a structure illustration of the guide groove of magnets and dial of the apparatus of the invention.
Figure 7A:
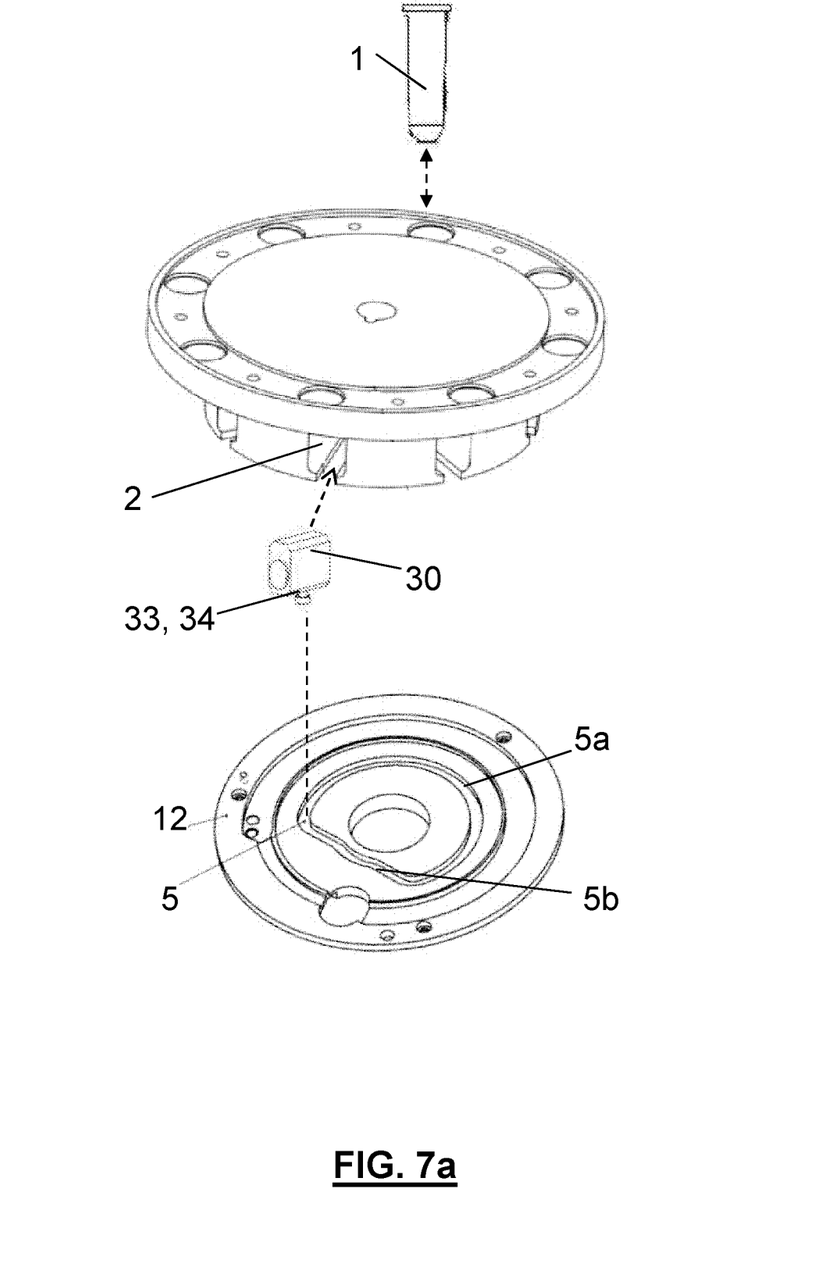
FIG. 7a is an illustration of the way how the supporting dial, the cam groove and the magnetic sliding block are connected together.

The cam groove is designed based on need. By length design of isometric sections, the extraction time of the magnetic sliding block and the reaction cup can be controlled.

Figure 5A:
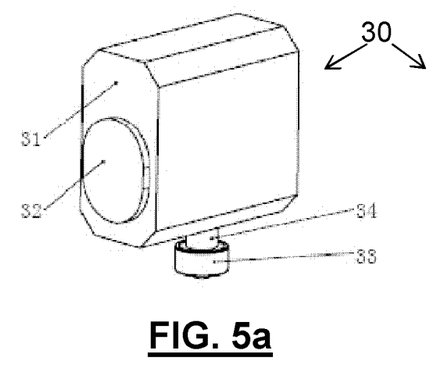
FIGS. 5a-b are a structure illustration of the magnetic sliding block the apparatus of the invention model; in the FIG. 5(a) is a front view of the magnetic sliding block; 5(b) is a back view of the magnetic sliding block.
Figure 5B:
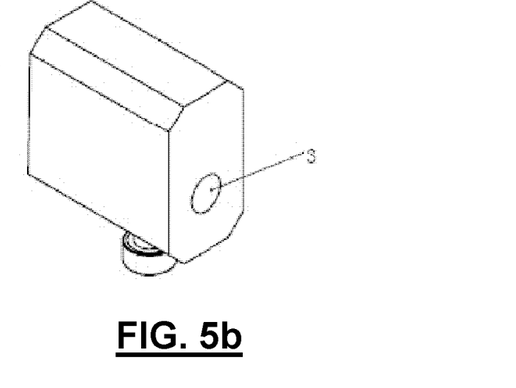

The magnetic sliding block 31 is equipped with permanent magnet 32 with one side inclined based on inclination of external surface of the reaction cup. If the external wall of the reaction cup 1 is inclined, the end surface of the magnetic sliding block 31 is also accordingly inclined, and thus the permanent magnet 32 shall be well close to the surface of the reaction cup.

The apparatus further comprises magnetic particle mixing mechanism (see also FIGS. 8, 9a, 9b) installed on the supporting dial mechanism. The magnetic particle mixing mechanism comprises brushless DC motor 71, motor stand 72, eccentric shaft 73 with bearing on, mixing spindle 75 and mixing head 77.

Figure 9A:
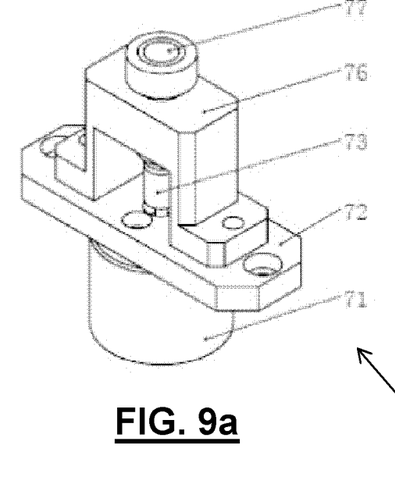
FIGS. 9a-b are an illustration of magnetic particle mixing mechanism of the apparatus of the invention; in the figure, 9(a) is a 3D view and 9(b) is a section view.
Figure 9B:
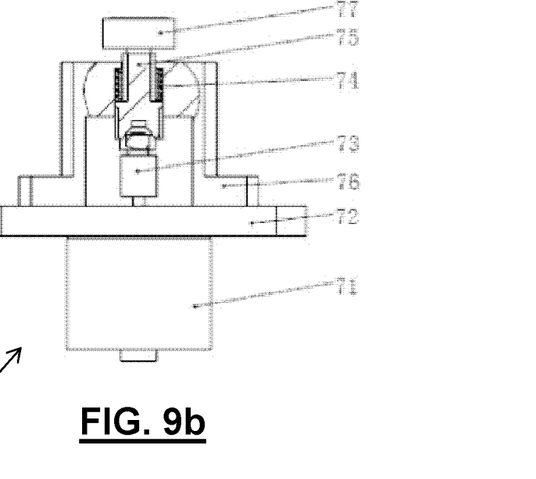

The motor stand 72 is fixed on the mounting plate 21. The brushless DC motor 71 is installed on the motor stand 72. Spindle of the brushless DC motor 71 passes through the motor stand 72 to connect to the eccentric shaft 73 with bearing on. The eccentric shaft 73 with bearing on, mixing spindle 75 and mixing head 77 connect in turn, and the mixing head supports the reaction cup to move eccentrically, and to achieve mixing.

When the reaction cup moves to the mixing position, as described below with reference to FIG. 8, the mixing mechanism is able to shake (or stir) the reaction cup: in particular the head under the reaction cup performs eccentric movement, around the motor axis, without rotating, and that brings the lower end of the reaction cup to perform the same eccentric movement and thus materials in the reaction cup are mixed.

Figure 4:
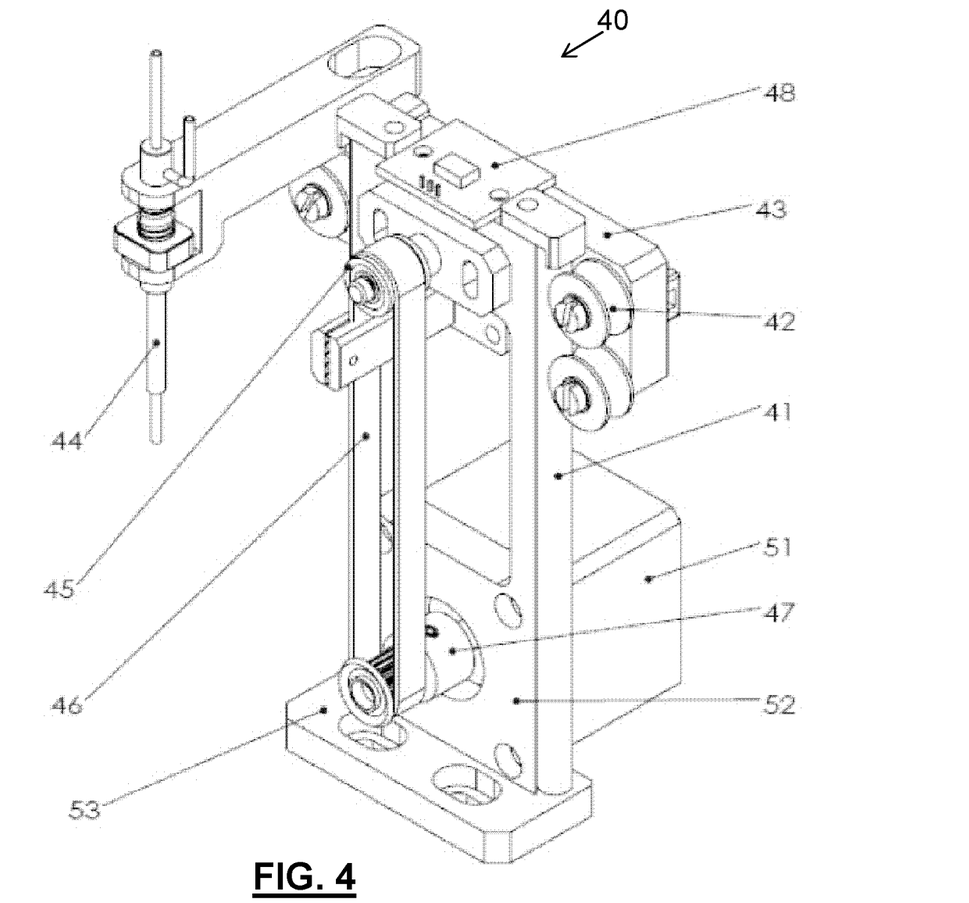
FIG. 4 is an illustration of washing mechanism of the apparatus of the invention.
Figure 4A:
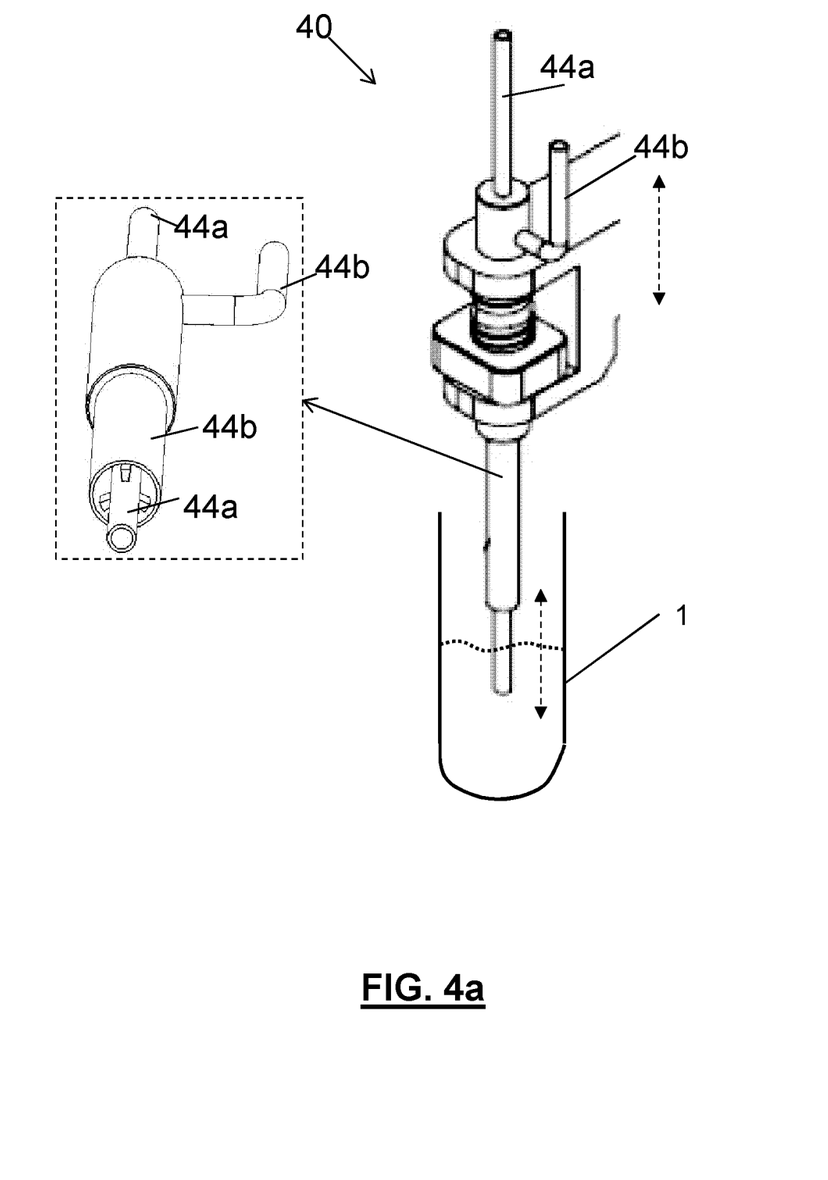
FIG. 4a is a magnified view of the washing mechanism of FIG. 4 in the working situation immersed in a reaction cup, with a further enlarged view aside.

As shown in FIGS. 4 and 4a, the washing mechanism comprises guide shaft 41, guide pulley 42, washing sliding block 43, washing needle 44, driven pulley 45, timing belt 46, timing pulley 47, Hall sensor 48, step motor 51, step motor fixation plate 52 and the washing fixation base plate 53.

The guide pulley 42 is equipped at two sides of the washing sliding block and the guide shaft 41 is equipped at two sides of the second step motor fixation plate 52, and the inner side of the guide pulley 42 contacts with the guide shaft 41.

The step motor fixation plate 52 is vertically installed on the washing fixation base plate 53. The step motor 51 is fixed on lower part of the step motor fixation plate 52. The step motor drives the timing pulley 47, with timing belt 46 to connect to the driven pulley 45 equipped on the step motor fixation plate 52 for transmission; the washing sliding block is equipped with the washing needle 44, and the washing sliding block is in connection to the timing belt 46 and moves upward and downward along with the timing belt; top of the step motor fixation plate 52 is equipped with home sensor 48 and the driven pulley 45 is equipped with an inducer.

During working of the washing mechanism, it is necessary to perform a reset to find the initial position: the step motor 51 moves clockwise. By transmission of the timing belt, it drives the washing sliding block 43 and the washing needles 44 equipped on it. When the home sensor 48 contacts the Second home inducer, the reset action is completed.

The action of liquid charging is performed as follows: when the step motor 51 moves counterclockwise, with transmission of the timing belt, it drives the washing sliding block 43 and washing needle 44 equipped on it to move downward to the appointed position in the reaction cup 1, and to start charging liquid into the reaction cup. After charging liquid, the step motor 51 moves clockwise, the washing needle 44 moves upward till the reset position. During this process, it is needed to ensure that the liquid charged will be kept away from the external wall of the washing needle, therefore increasing speed of the liquid surface is slower than lifting speed of the washing needle.

The action of liquid extraction is performed as follows: when liquid in the reaction cup is to be extracted, the step motor 51 moves counterclockwise. With transmission of the timing belt, it drives the washing sliding block 43 and washing needle 44 equipped on it to move downward. At this time, the washing needle 44 has extraction absorption force to ensure that extraction from the reaction cup 1 starts as long as contacting surface of liquid. During extraction, it is needed to ensure that the liquid charged will be kept away from the external wall of the washing needle, therefore lifting speed of the washing needle is slower than declining speed of the liquid surface.

The washing needle in the washing mechanism is concentric dual-tubing washing needle. The outer tubing is a charging needle and the innner tubing is an extraction needle. The outer tubing of the needle is shorter than the innner tubing, so that the lower end of the inner tubing is not surrounded by the outer tubing.

There is at least one set of washing mechanism in the apparatus. However it is also possible to have multiple sets of washing mechanism which will form a multilevel synchronous washing, and thus time saving and washing strengthening is achieved.

In FIG. 1 it is shown that four washing mechanisms are installed around the supporting dial 11. The latter rotates so as to stop in correspondence between the holes with cups and the washing mechanisms.

With reference to FIG. 4a, the washing needle 44 can move vertically in the reaction cup 1, and the liquid level in the cup changes, depending on the charging or extraction actions of the washing needle 44. The vertical movement of the washing needle 44 is such that the longer inner tubing 44a can reach the bottom level of the cup, so as to be able to extract all the liquid in the cup. The movement downward of the inner tubing 44a is such that to follow the liquid level in the cup, so as to be inside the liquid till the end of the extraction action. At the end of the extraction, the liquid charging starts by the shorter outer tubing of the needle, so as the movement upward of the needle follows the lifting of the liquid level in the cup. At the same time, due to the concentricity of the dual tubing of the needle, an additional action of good and uniform cleaning of the inner side end of the needle is achieved, due to the flow of the charging liquid uniformly around said inner tubing end.

In the upper side of the washing mechanism the inner tubing 44a (extraction) of the needle exits centrally, while the outer tubing 44b (charging) of the needle exits sidewise. Above the upper part of the washing mechanism there is a tool, not shown, for liquid input and output in and from the upper sides of the needle.

Figure 8:
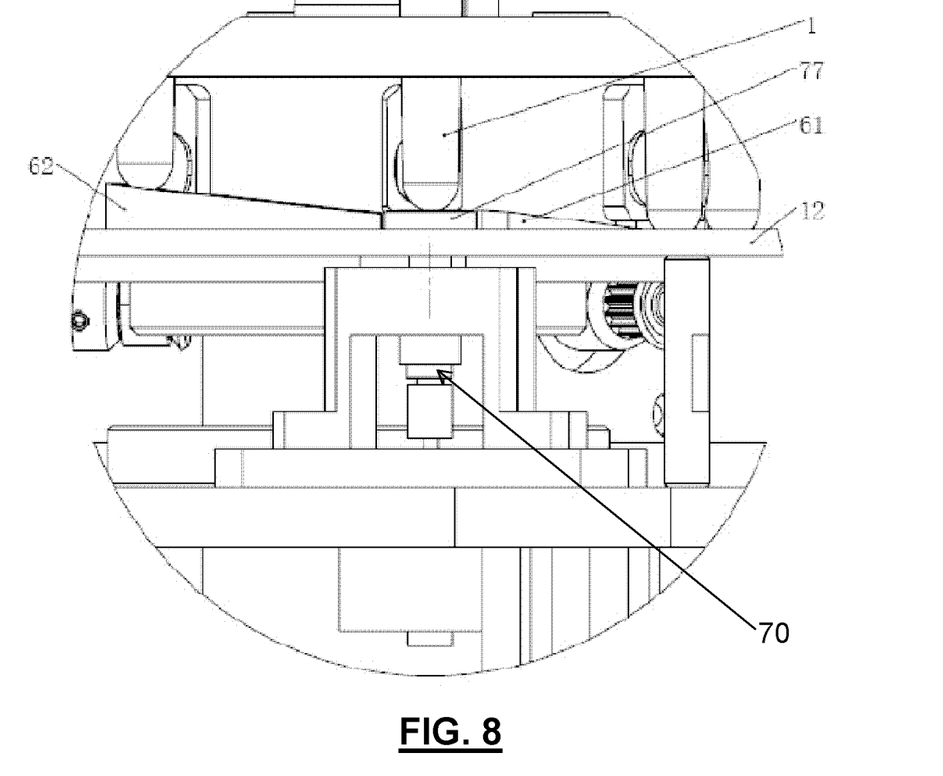
FIG. 8 is an illustration of locally magnified climbing block and interaction with the mixing mechanism of the apparatus of the invention.

As shown in FIG. 8, the apparatus further comprises climbing and lifting mechanism equipped on the fixation plate 12 to move vertically the reaction cup. The climbing and lifting mechanism consists of low level climbing block 61 and high level climbing block 62.

Both of the highest point of the low level climbing block and the lowest point of the high level climbing block are aligned with the mixing head 77.

The climbing and lifting block is made i.e. from Teflon.

The mixing head 77 equipped on mixing work station is located between the low level climbing block and high level climbing block.

The reaction cup climbs up to the mixing head of the mixing work station along the low level climbing block during moving with the support dial 11, and climbs up to the cup getting work station along the high level climbing block. At the highest level (see also FIG. 1) the upper part of the cup is above the level of the supporting dial, and the reagent cup is caught by a mechanism not shown.

The climbing block and rotation of the spindle form the climbing lifting mechanism, and no extra lifting mechanism is needed to lift the reaction cup up.

Surface of the climbing and lifting mechanism is tangent with arc surface of the reaction cup bottom.

There is spare room for the reaction cup when being placed in the dial hole, and it can swing and move upward and downward. Design of the climbing block is in tangency with bottom arc surface of the reaction cup. Thus, along with rotation of the dial, arc surface of the reaction cup slides along surface of the climbing block. Along with rising of the climbing block, it rises up.

As shown in FIG. 9a and FIG. 9b, also with reference to the above description, the magnetic particle mixing mechanism is equipped with mixing base 76, the mixing base is fixed on the motor stand 72; the mixing rotation shaft passes through the mixing base. Between the mixing base and the mixing rotation shaft, the mixing rotation shaft is covered with pressure spring 74.

Figure 10A:
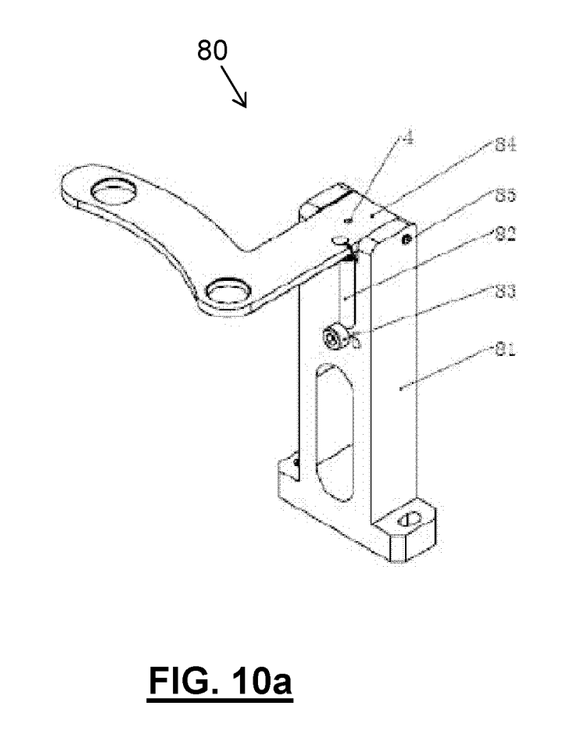
FIGS. 10a-b are an illustration of the elastic pressing plate set of the apparatus of the invention; in the figure, 10(a) is a 3D view and 10(b) is a section view.
Figure 10B:
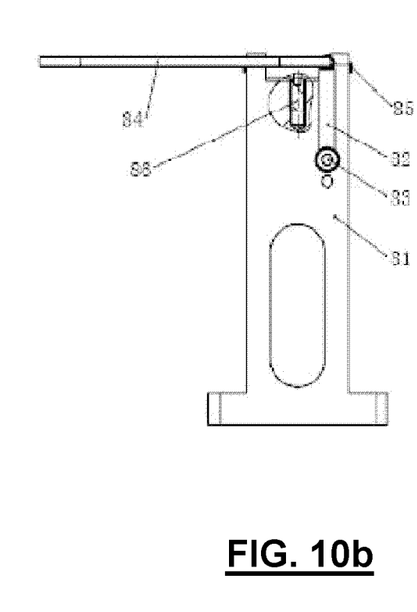

As shown in FIGS. 1, 10a, and 10b, the magnetic particle mixing mechanism is equipped with elastic pressing plate set 80. The elastic pressing plate set 80 comprises elastic pressing plate installation base 81, extension spring 82, pop-rivet 83, pressing plate 84, second pin roll 85 and adjusting screw 86.

The elastic pressing plate installation base 81 is fixed on the mounting plate 21 of the coding dial mechanism 10. The pressing plate 84 connects to the elastic pressing plate installation base 81 with the pin roll 85. The adjusting screw 86 is screwed into the elastic pressing plate installation base 81 to jack up the pressing plate 54. One end of the extension spring 82 hooks the pressing plate 84, and the other end hooks the pop-rivet 83 fixed on the elastic pressing plate installation base 81.

The pressing plate is equipped with adjusting holes 4. With the adjusting holes 4, height of the adjusting screws can be changed; diameter of the adjusting holes 4 is bigger than the internal diameter of the adjusting screw 86, and smaller than external diameter of the adjusting screw.

It is possible to turn the adjusting screw bolts with socket head wrench passing through the adjusting hole 4 to change depth of the adjusting screw bolt in the spring pressing plate installation seat. By this way, it is possible to change included angle of the pressing plate and the horizontal surface, namely to adjust tilt angle of the pressing plate 84 to make edge of the reaction cup smoothly reach the mixing position. During mixing, the pressing plate blocks the reaction cup to prevent the reaction cup from being ejected from the placing hole during mixing.

Along with progressive rotation speed of the step motor when driving the timing belt, the reaction cup rotates along the dial. There are eight holes in the dial. Each progression moves to the next hole. Time interval between progressions if fixed, namely rotation of 45° for each progression. Four independent charging and extraction mechanisms are present, achieving flexible and free automatic charging and extraction of liquid. The charging needle may automatically wash the extraction needle to prevent cross infection between different items to be tested; the climbing and lifting mechanism allows lifting of the reaction cup by level, and it firstly reaches mixing height, and then rises to the cup catching height, where the cup can be easily caught and no other lifting mechanism to lift the reaction cup up needed. In addition, the magnetic separation mechanism may flexibly control extraction time of the magnet, and its structure features compact, less room occupied, good repeatability of each moving part, and function of nanometer magnetic beads separation on the immunoanalyzer and automatic washing achieved.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the scope of the invention are deemed to be covered by this invention.

The elements and characteristics described in the various forms of preferred embodiments can be mutually combined without departing from the scope of the invention.

Further implementation details will not be described, as the man skilled in the art is able to carry out the invention starting from the teaching of the above description.

The invention claimed is:

1. An apparatus for separation, washing and mixing of magnetic particles in reaction cups, adapted to be used in an immunoanalyzer system, each of the reaction cups containing nanometric magnetic particles binding immuno-complex antibody, antigen molecules, and a liquid, comprising:
   a supporting frame provided with a mounting plate;
   a supporting dial mechanism, in the form of a rotating carousel, mounted on said mounting plate and comprising:
      an upper side with a number of holes, each hole being adapted to host a respective reaction cup from the reaction cups, in a substantially vertical position, and
      a lower side comprising a number of guide grooves extending radially along the same radial axis as the corresponding holes of the upper side;
   said supporting dial mechanism being coupled with a first motor, said first motor driving the rotation of the supporting dial mechanism;
   at least one washing mechanism, said washing mechanism comprising:
      a motor couple to said mounting plate and coupled with a washing needle, said motor driving said washing needle by either inserting the washing needle in the respective reaction cup housed in the corresponding hole of said supporting dial mechanism or withdrawing the washing needle from the respective reaction cup housed in the corresponding hole of said supporting dial mechanism;
      said washing needle comprising an inner tubing and an outer tubing, wherein the inner tubing is placed inside the outer tubing forming a concentric dual-tubing; wherein, said inner tubing is configured to extract the liquid from the respective reaction cup and said outer tubing is configured to inject a washing liquid in the respective reaction cup;

at least one mixing mechanism, fixed on said mounting plate, below and aside said supporting dial mechanism, said mixing mechanism comprising:
- a mixing head attached to a mixing spindle coupled with an electric motor; said electric motor driving an eccentric movement of said mixing head;
- a number of magnet mechanisms, each inserted in said lower side in a corresponding one of said guide grooves and sliding therein so as to:
- radially approach to one of said reaction cups at said at least one washing mechanism; and
- radially depart from the side of the external surface of one of said reaction cup at said at least one mixing mechanism;
- a control system programmed for:
  - activating said first motor rotating said supporting dial mechanism, step by step, so as to stop in positions such that said reaction cups housed in said holes are in sequence either below said washing needle of said washing mechanism or the lower end of the respective reaction cup is supported by the mixing head of said mixing mechanism; and
  - activating said washing mechanism to insert said washing needle in the reaction cup housed in the corresponding hole;
  - activating said at least one washing mechanism to extract the liquid from the respective reaction cup;
  - activating said at least one washing mechanism to inject a washing liquid in the respective reaction cup;
  - activating said at least one washing mechanism to withdraw said washing needle from the respective reaction cup housed in the corresponding hole;
  - activating said at least one mixing mechanism to move eccentrically said mixing head, causing the lower end of the reaction cup, supported by the mixing head, to perform an eccentric movement.

2. The apparatus as in claim 1, wherein said outer tubing is shorter than said inner tubing, so that the lower end of said inner tubing is not surrounded by said outer tubing.

3. The apparatus as in claim 1, wherein said at least one mixing mechanism comprises an eccentric shaft engaged to the electric motor and to the mixing head.

4. The apparatus as in claim 1, further comprising a climbing and lifting mechanism comprising a climbing block; said climbing block is shaped as a wedge and having an inclined surface tangent to a bottom arc surface of the reaction cup;
- wherein the highest point of said inclined surface is aligned with said mixing head;
- wherein, during the rotation of the supporting dial mechanism, the bottom surface of the reaction cup, moving to said at least one mixing mechanism, slides along the inclined surface of said climbing block before arriving at the mixing head.

5. The apparatus as in claim 1, wherein said at least one mixing mechanism further comprises an elastic pressing plate set, said elastic pressing plate set being placed aside and above said supporting dial mechanism;
- the elastic pressing plate set comprising a pressing plate engaging and elastically pressing at least one reagent cup from above while said eccentric movements are in progress on said at least one reagent cup.

\* \* \* \* \*